US008945445B2

(12) United States Patent
Komatsu et al.

(10) Patent No.: US 8,945,445 B2
(45) Date of Patent: Feb. 3, 2015

(54) METHOD OF PRODUCING ANODE MATERIAL FOR NON-AQUEOUS ELECTROLYTE SECONDARY BATTERY

(75) Inventors: Hajime Komatsu, Iwaki (JP); Kenjiro Hara, Iwaki (JP); Michihisa Miyahara, Tokyo (JP)

(73) Assignee: Kureha Corporation (JP)

( * ) Notice: Subject to any disclaimer, the term of this patent is extended or adjusted under 35 U.S.C. 154(b) by 218 days.

(21) Appl. No.: 13/188,008

(22) Filed: Jul. 21, 2011

(65) Prior Publication Data

US 2012/0043684 A1    Feb. 23, 2012

Related U.S. Application Data

(63) Continuation-in-part of application No. PCT/JP2010/000110, filed on Jan. 12, 2010.

(30) Foreign Application Priority Data

Jan. 21, 2009 (JP) ................ 2009-010750

(51) Int. Cl.
| | |
|---|---|
| *B28B 1/00* | (2006.01) |
| *H01M 10/0525* | (2010.01) |
| *C04B 35/528* | (2006.01) |
| *C04B 35/626* | (2006.01) |
| *H01M 4/587* | (2010.01) |

(52) U.S. Cl.
CPC ......... *H01M 10/0525* (2013.01); *C04B 35/528* (2013.01); *C04B 35/6269* (2013.01); *H01M 4/587* (2013.01); *C04B 2235/5427* (2013.01); *C04B 2235/5436* (2013.01); *C04B 2235/602* (2013.01); *C04B 2235/663* (2013.01); *C04B 2235/723* (2013.01); *C04B 2235/95* (2013.01); *Y02E 60/122* (2013.01); *Y02T 10/7011* (2013.01)
USPC ....................................... 264/104

(58) Field of Classification Search
USPC ........................................ 264/29.1
See application file for complete search history.

(56) References Cited

U.S. PATENT DOCUMENTS

| 5,741,472 A | * | 4/1998 | Sonobe et al. ........... 423/460 |
| 5,772,974 A |   | 6/1998 | Ohashi et al. |

(Continued)

FOREIGN PATENT DOCUMENTS

| JP | 61-111963 A |   | 5/1986 |
| JP | 62064891 A  | * | 3/1987 |

(Continued)

OTHER PUBLICATIONS

English abstract of JP62-64891.*

(Continued)

*Primary Examiner* — Larry Thrower
*Assistant Examiner* — Xue Liu
(74) *Attorney, Agent, or Firm* — Cantor Colburn LLP

(57) ABSTRACT

Provided is a method of producing an anode material for a non-aqueous electrolyte secondary battery having battery characteristics equivalent to those of a conventional product by simpler production steps than those of a conventional method.

A thermally-polymerized petroleum based or coal based pitch is cooled to the softening point or below so that the pitch is solidified to obtain a solidified pitch. The solidified pitch is ground to form a fine pitch powder having an average particle size (median size) of 60 μm or smaller. Then, the fine pitch powder is compression molded at a pressure of 20 to 100 MPa or 0.1 to 6 MN/m to form a porous compression molded pitch. The porous compression molded pitch is subjected to infusibilization treatment.

4 Claims, 4 Drawing Sheets

(56) References Cited

U.S. PATENT DOCUMENTS

| | | | |
|---|---|---|---|
| 5,795,678 A * | 8/1998 | Takami et al. | 429/218.1 |
| 6,733,737 B1 * | 5/2004 | Tan et al. | 423/447.5 |
| 2007/0287068 A1 | 12/2007 | Shimizu et al. | |
| 2009/0297953 A1 | 12/2009 | Shimizu et al. | |

FOREIGN PATENT DOCUMENTS

| | | |
|---|---|---|
| JP | 8-279358 A | 10/1996 |
| JP | 2006-236942 A | 9/2006 |
| JP | 2007-311180 A | 11/2007 |
| WO | 2005098999 A1 | 10/2005 |
| WO | 2007040007 A1 | 4/2007 |

OTHER PUBLICATIONS

International Search Report for International Application No. PCT/JP2010/000110 mailing date of Mar. 2, 2010 with English translation.

* cited by examiner

Figure 2
(a)
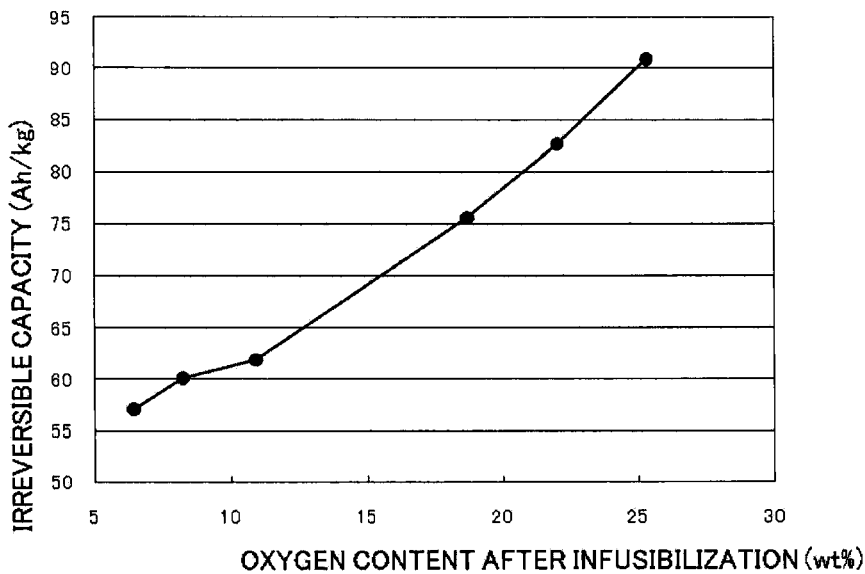
(b)
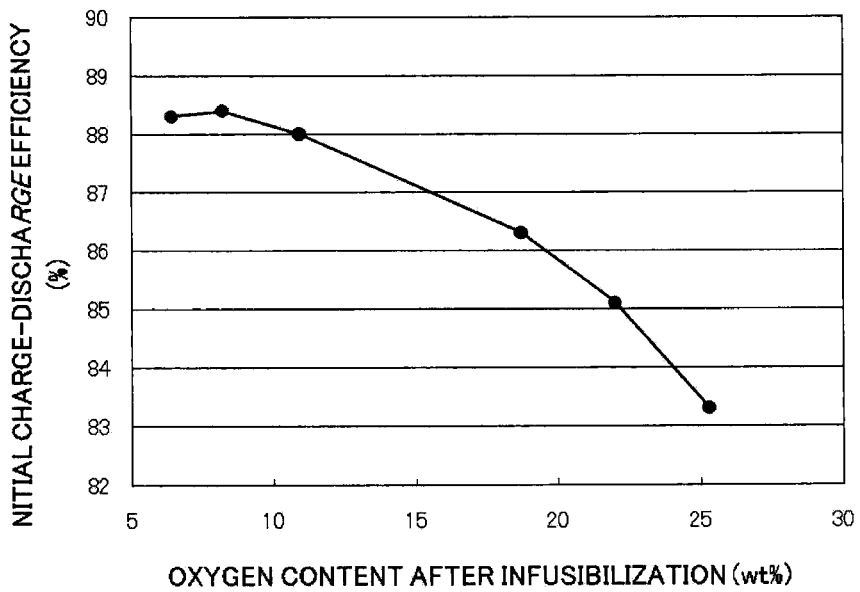

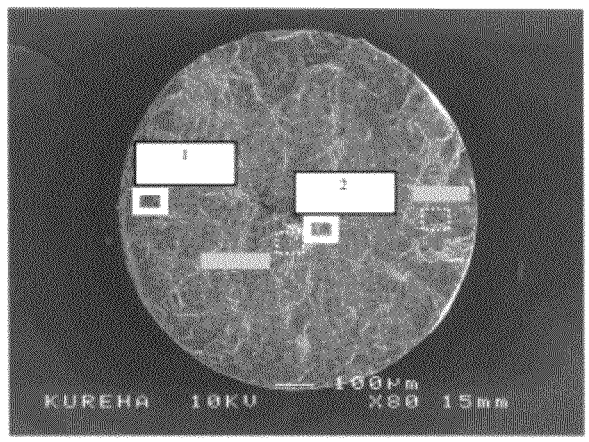

Surface Observed 1
  Surface Layer Portion O/C Ratio = 0.16
Surface Observed 2
  Central Portion O/C Ratio = 0.16

(b)

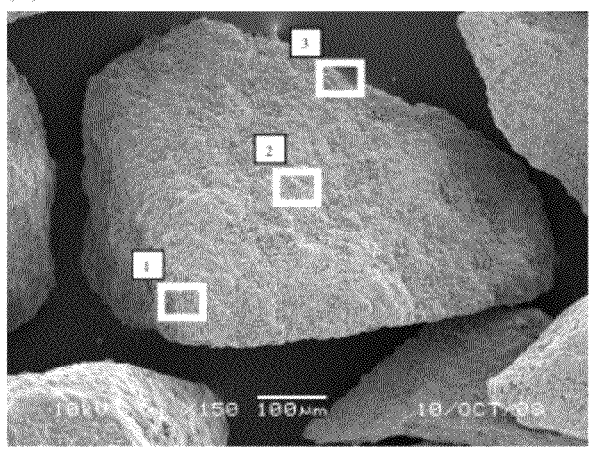

Surface Observed 1
  Surface Layer Portion O/C Ratio = 0.09
Surface Observed 2
  Central Portion O/C Ratio = 0.08
Surface Observed 3
  Surface Layer Portion O/C Ratio = 0.08

Figure 4

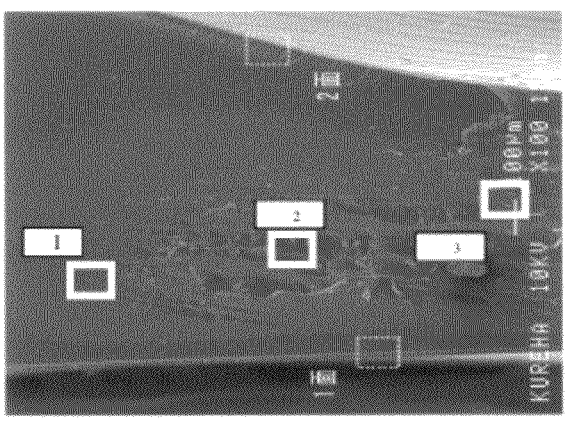

Surface Observed 1
  Surface Layer Portion O/C Ratio = 0.15
Surface Observed 2
  Central Portion O/C Ratio = 0.03
Surface Observed 3
  Surface Layer Portion O/C Ratio = 0.14

Figure 5
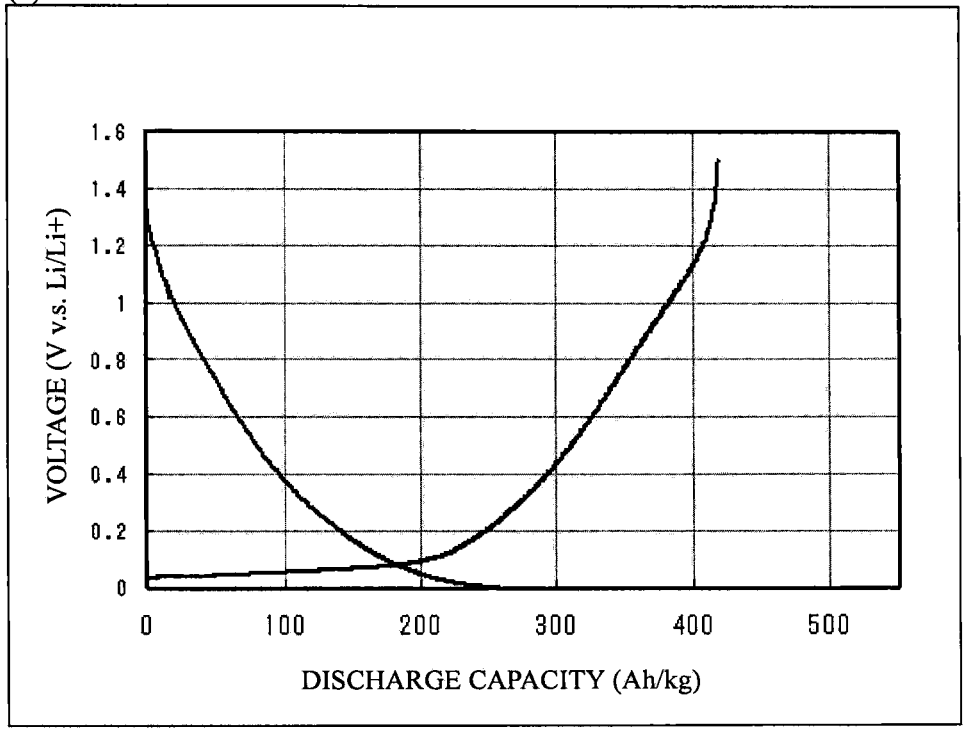
(a)
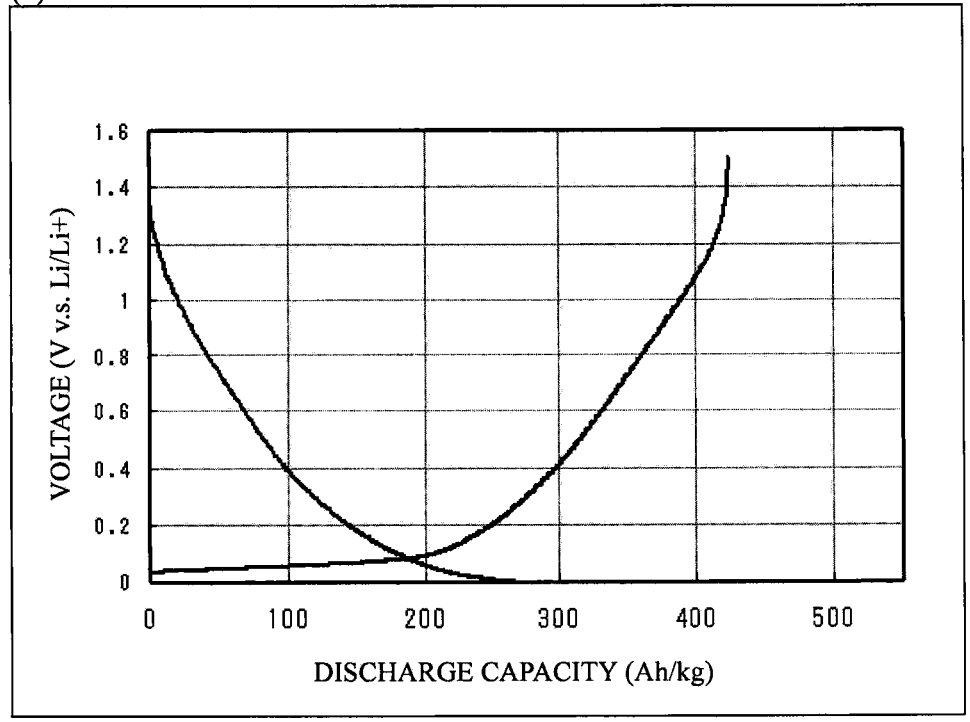
(b)

ically in a high input/output current-type non-aqueous electrolyte secondary battery exemplified by a non-aqueous electrolyte secondary battery for a hybrid electric vehicle (HEV), has reduced irreversible capacity, and is excellent in charge-discharge efficiency, and to provide an anode material obtained by the production method. In particular, an object of the present invention is to provide a method of producing an anode material for a non-aqueous electrolyte secondary battery having battery characteristics equivalent to those of a conventional product, by simpler production process than one of a conventional method.

METHOD OF PRODUCING ANODE MATERIAL FOR NON-AQUEOUS ELECTROLYTE SECONDARY BATTERY

CROSS REFERENCE TO RELATED APPLICATIONS

This is a continuation-in-part application of International Application No. PCT/JP2010/000110, filed on Jan. 12, 2010. Priority under 35 U.S.C. 119(a) and 35 U.S.C. 365(b) is claimed from Japanese Application No. JP 2009-010750, filed Jan. 21, 2009, the disclosure of which is also incorporated herein by reference.

TECHNICAL FIELD

The present invention relates to a method of producing an anode material for a non-aqueous electrolyte secondary battery.

BACKGROUND ART

As a secondary battery with high energy density, a non-aqueous electrolytic lithium secondary battery using a carbonaceous material as an anode is widely studied. While the demand for a nonaqueous electrolytic lithium secondary battery for use as a power supply of a mobile device is still increasing, a new use of a nonaqueous electrolytic lithium secondary battery as a battery of an electric vehicle such as an electric vehicle (EV) driven by a motor alone and a hybrid electric vehicle (HEV) using a combination of an internal combustion engine and a motor is actively developed.

A popularly-used constituent material of an anode of a lithium secondary battery is a carbon based material, and other examples include materials comprising a metallic element such as Zn, Al and Sn or a metalloid element such as Si, Ge, and Sb. As a carbon based material, non-graphitizable carbon (also called "hard carbon") having a potential capacity that the discharged capacity per kilogram of carbon is significantly higher than the theoretical discharged capacity of graphite, 372 Ah/kg, is also widely used. Especially as a battery for an electric vehicle, non-graphitizable carbon has drawn great attention from the viewpoint of high input-output characteristics that high electric power is repeatedly supplied and received in a short period of time.

Non-graphitizable carbon using a petroleum-based or coal-based pitch as a raw material is proposed as suitable non-graphitizable carbon for use as a constituent material of an anode of a lithium secondary battery (Patent Documents 1 to 3). Typical, conventional steps of producing a desired anode material for a battery from a pitch material are shown in FIG. 1.

As shown in FIG. 1, in the existing process, an anode material is produced through the following steps of: melt blending a dicyclic or tricyclic aromatic compound having a boiling point of 200° C. or higher added as an additive to a petroleum-based or coal-based pitch material and molding to obtain a molded pitch ("melt blending and molding step"); extracting the additive from the molded pitch with a solvent having low solubility to the pitch and high solubility to the additive to obtain a porous molded pitch ("extracting and drying step"); oxidizing the porous molded pitch with an oxidizing agent such as air to obtain an infusibilized pitch ("oxidizing step" or "infusibilizing step"); heating the infusibilized pitch to 600° C. or 680° C. in an inert gas atmosphere (normal pressure) to remove an organic component (tar component) contained in the infusibilized pitch to obtain a carbon precursor having a low volatile content ("tar removal step"); grinding the carbon precursor to obtain a powdery carbon precursor ("grinding step"); and firing the powdery carbon precursor in an inert gas at about 800 to 1500° C. to carbonize the powdery carbon precursor ("heat treatment step").

The porous molded pitch obtained through the step of melt blending and molding and the step of extracting has problems of dispersion of fine powder and inadequate removal of heat in the step of oxidizing. Hence, it is necessary to appropriately carry out a grinding or classification process to obtain a molded article with an appropriate size (average particle size: 100 to 2000 μm; the average particle size indicates a median size hereinafter, unless otherwise specified). Further, the use of an additive or extraction solvent in the step of melt blending and molding makes the production steps complicated because it requires the step of extracting and drying the additive or solvent afterward and, furthermore, the use of an additive or extraction solvent leads to emission of wastes, imposing problems in terms of production costs and environmental issues.

On the other hand, when a pitch material (average particle size: 0.07 to 10 mm) produced without being subjected to the step of melt blending and molding and the extraction step is subjected to infusibilization treatment as a petroleum based or coal based pitch material, the pitch material is not uniformly infusibilized, causing a problem that the infusibilization treatment takes a long time. Thus, an improvement has been demanded.

CITATION LIST

Patent Documents

Patent Document 1: JP 8-279358 A
Patent Document 2: WO 2005/098999
Patent Document 3: WO 2007/040007

SUMMARY OF INVENTION

Technical Problem

A major object of the present invention is to provide a method of producing an anode material for a non-aqueous electrolyte secondary battery which is suitable for use especially in a high input/output current-type non-aqueous electrolyte secondary battery exemplified by a non-aqueous electrolyte secondary battery for a hybrid electric vehicle (HEV), has reduced irreversible capacity, and is excellent in charge-discharge efficiency, and to provide an anode material obtained by the production method. In particular, an object of the present invention is to provide a method of producing an anode material for a non-aqueous electrolyte secondary battery having battery characteristics equivalent to those of a conventional product, by simpler production process than one of a conventional method.

Solution to Problem

The infusibilization treatment in the method of producing an anode material for a non-aqueous electrolyte secondary battery is a step of oxidizing with an oxidizing agent such as air to obtain an oxidized pitch which is infusible to heat. Preferably, the oxidation treatment is carried out at a temperature of 50° C. to 400° C. As an oxidizing agent, $O_2$, $O_3$, $NO_2$, $Cl_2$ or a mixed gas thereof diluted with air, nitrogen or the like, an oxidizing gas such as air, or an oxidizing liquid such as sulfuric acid, phosphoric acid, nitric acid, an aqueous solution of chromate, an aqueous solution of permanganate, and an aqueous solution of hydrogen peroxide can be used. Studies by the present inventors reveal that the amount of oxygen introduced by infusibilization treatment will significantly affect the battery performance of an anode material which is ultimately obtained after the subsequent steps. Specifically, when the oxygen content of the infusibilized pitch is increased, the irreversible capacity tends to increase and the initial charge-discharge efficiency tends to decrease (FIG. 2). An anode material for a non-aqueous electrolyte secondary battery is required to have small irreversible capacity and high initial charge-discharge efficiency. Hence, the oxygen content of the infusibilized pitch is preferably 5 to 25 wt %, more preferably 7 to 22 wt %, even more preferably 8 to 17 wt %.

In an attempt to attain the oxygen content of the infusibilized pitch in the range of 5 to 25 wt %, preferably 7 to 22 wt % and to solve the above problems in order to obtain an anode material for a non-aqueous electrolyte secondary battery having excellent battery performance, the present inventors conducted intensive and extensive studies. Consequently, they found that by grinding the pitch to obtain a fine pitch powder and then compression molding the fine pitch powder, a porous molded pitch suitable for infusibilization treatment can be obtained without using any additive or extraction solvent. With this finding, the present invention was completed.

Specifically, the present invention provides a method of producing an anode material for a non-aqueous electrolyte secondary battery, comprising grinding a petroleum based or coal based pitch to form a fine pitch powder having an average particle size (median size) of 60 μm or smaller, preferably 5 μm to 40 μm, compression molding the fine pitch powder to form a porous compression molded pitch, and subjecting the porous compression molded pitch to infusibilization treatment to obtain an infusibilized pitch.

As to molding of a powder and the like, various techniques are publicly known. Particularly a process of molding a powder or a solution in which a powder is dissolved into a granule is called granulation, and is industrially implemented. For example, the following granulation methods are known: tumbling granulation for obtaining a granule such as konpeito (sugar candy) and chemical fertilizer; fluid bed granulation for obtaining a granule such as talc, detergent and cocoa; stirring granulation for obtaining a granule such as a sludge pellet; compression granulation for obtaining a granule such as a pharmaceutical tablet; extrusion granulation for obtaining a granule such as waste fuel (RDF); melt granulation for obtaining a granule such as sodium hydroxide and alumina particle; spray granulation for obtaining a granule such as instant coffee and ammonium sulfate, etc. The present inventors comprehensively examined the battery characteristics and the like of an anode material, and found optimum conditions for application to a fine pitch powder and optimum conditions for infusibilization treatment in the case of compression granulation. With these findings, the present invention was completed.

In the present invention, an existing molding machine can be used in the compression molding. Specific examples include, but are not limited to, a single vertical molding machine, a continuous rotary molding machine, a continuous roll compression molding machine, etc. Preferably, the pressure at the time of compression molding is 20 to 100 MPa in surface pressure or 0.1 to 6 MN/m in line pressure, more preferably 23 to 86 MPa in surface pressure or 0.2 to 3 MN/m in line pressure. The time of maintaining the pressure at the time of compression molding can appropriately be determined according to the type of a molding machine, properties of a fine pitch powder and the amount of a fine pitch powder to be treated, and is normally in the range of about 0.1 seconds to 1 minute.

In the present invention, when a fine pitch powder is compression molded, a binder (binding agent) may be added as necessary. Specific examples of a binder include, but are not limited to, water, starch, methylcellulose, polyethylene, polyvinyl alcohol, polyurethane, phenolic resin, etc.

The shape of the porous molded pitch obtained by compression molding is not particularly limited. Examples of the shape include granule, cylinder, sphere, pellet, plate, honeycomb, block, Raschig ring, etc.

The porous compression molded pitch which was compression molded at a pressure within the above range is subjected to infusibilization treatment, whereby a suitable oxygen content for an anode material for a non-aqueous electrolyte secondary battery, i.e., an oxygen content of 5 to 25 wt %, preferably 7 to 22 wt %, is achieved.

In the present invention, after the fine pitch powder is formed, the fine pitch powder is classified into a fine pitch powder having an average particle size (median size) of 5 μm to 40 μm and a fine pitch powder having an average particle size (median size) of less than 5 μm, and the fine pitch powder having an average particle size (median size) of less than 5 μm is melted again at the softening point or above and thereafter cooled again to the softening point or below so that the pitch is solidified to reuse it as a solidified pitch. This is also preferred in terms of yield. The heating temperature differs according to the softening point of the fine pitch powder to be used. In general, the softening point of the fine pitch powder is 140° C. to 260° C. Thus, the heating temperature is preferably 200° C. to 390° C., more preferably 250° C. to 350° C.

The pitch used in the present production method is not particularly limited, and a petroleum based, a coal based pitch, a nitric acid oxidized pitch or the like can be used.

The infusibilized pitch obtained by subjecting the porous compression molded pitch to infusibilization treatment is subjected to the steps of removing tar, grinding and heat treatment, as in the conventional method, whereby an anode material for a non-aqueous electrolyte secondary battery is produced.

Advantageous Effect of Invention

By the production method of the present invention in which a porous compression molded pitch is subjected to infusibilization treatment, an anode material for a non-aqueous electrolyte secondary battery having battery characteristics equivalent to those of a conventional product is produced by much more simplified production process than one of a conventional method. Particularly, the step of melting and blending with addition of an additive or solvent and the step of extracting and drying the additive or solvent, both of which are required in a conventional method to prepare porous pitch beads, can be excluded. Thus, the addition of an additive or solvent can be excluded and wastes originating from the additive or solvent can be avoided, reducing production process and production costs significantly.

Further, after the fine pitch powder is formed, the fine pitch powder is classified into a fine pitch powder having an average particle size of 5 μm to 40 μm and a fine pitch powder having an average particle size of less than 5 μm, and the fine pitch powder having an average particle size of less than 5 μm is melted again at the softening point or above and thereafter cooled again to the softening point or below so that the pitch is solidified to reuse it as a solidified pitch, whereby the amount of a petroleum based or coal based pitch used as a raw material can be reduced.

BRIEF DESCRIPTION OF DRAWINGS

FIG. 2 is a graph showing the relation between the oxygen content and the battery performance.

FIG. 3(a) shows an XMA cross sectional image of an infusibilized pitch obtained by subjecting porous pitch beads of a conventional method to infusibilization treatment. FIG. 3(b) shows an XMA cross sectional image of an infusibilized pitch obtained by subjecting a porous compression molded pitch of the present invention method to infusibilization treatment.

FIG. 4 shows an XMA cross sectional image of a coarse ground pitch after the infusibilization treatment of the conventional method.

FIG. 5(a) is a graph showing the battery performance of an anode material for a non-aqueous electrolyte secondary battery which was produced using the porous pitch beads of the conventional method. FIG. 5(b) is a graph showing the battery performance of an anode material for a non-aqueous electrolyte secondary battery which was produced using the porous compression molded article of the present invention.

DESCRIPTION OF EMBODIMENTS

Figure 1:
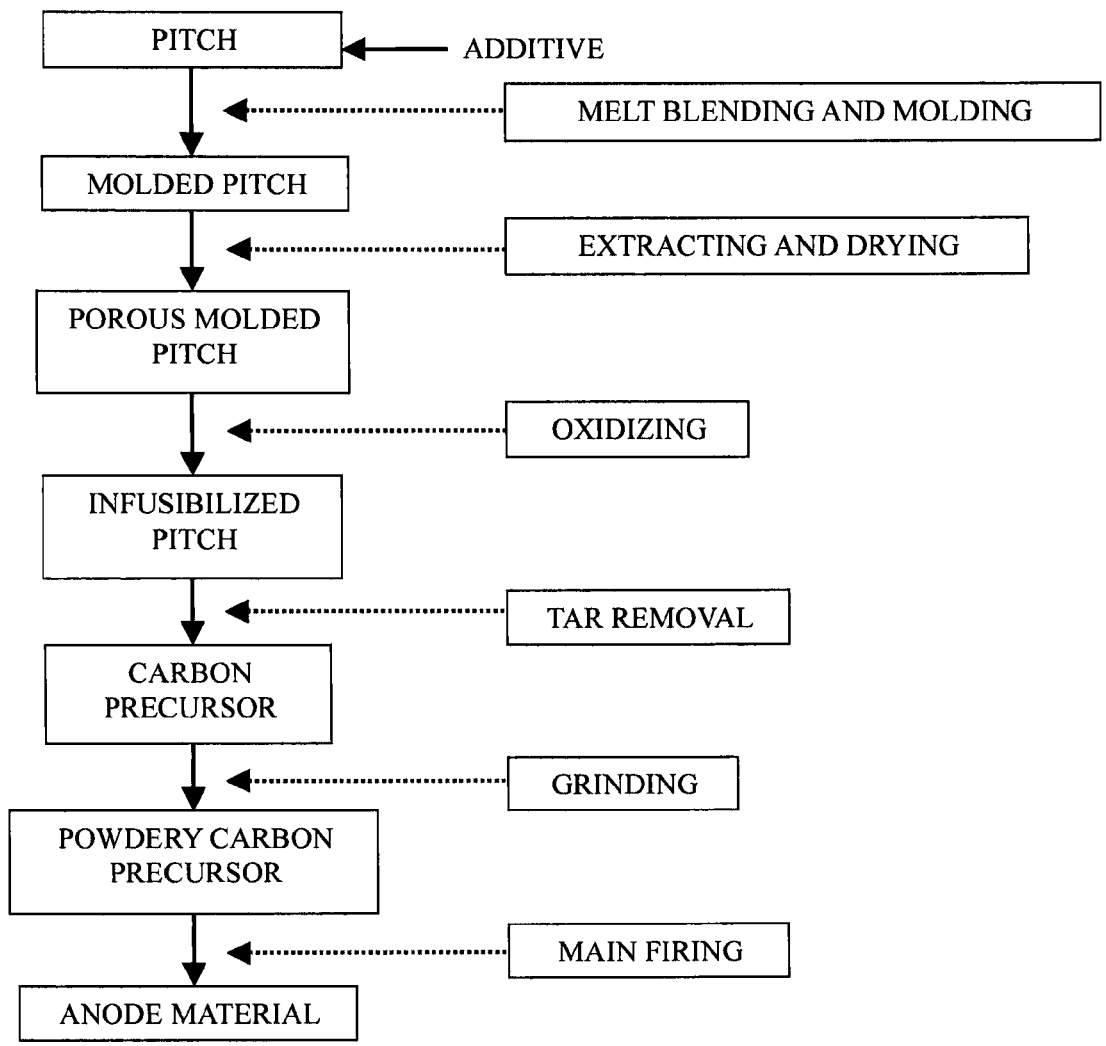
FIG. 1 shows a flowchart showing conventional steps of producing an anode material for a non-aqueous electrolyte secondary battery.

The present invention will be described in more detail below, with reference to the following Examples. It is to be noted that the present invention is not limited in any way by the following Examples.

Items to be measured in the Examples, methods for the measurement, and methods of preparing samples to be measured were as follows.

<Oxygen Content>

Elemental analysis was conducted by a CHN analyzer. The oxygen content was calculated using the following formula:

100%−C %−H %−N %.

<Method of Preparing Cells to be Measured and Evaluation of Charging Capacity and Discharged Capacity>

An infusibilized pitch which had been subjected to treatments up to the infusibilization treatment under the conditions specified in Table 1 was subjected to the steps of removing tar, grinding and heat treatment to thereby obtain an anode material. In the step of removing tar, the pitch in a nitrogen gas stream (space velocity: 485/min) was heated to 680° C. at the heating rate of 250° C./h and thereafter maintained at 680° C. for 1 hour. In the step of grinding, the pitch was ground into a powder having an average particle size (median size) of 9 μm. In the step of heat treatment, the pitch was heated to 1200° C. at the rate of 250° C./h while passing nitrogen gas and thereafter maintained at 1200° C. for 1 hour.

Non-aqueous electrolyte secondary batteries were prepared using the anode materials produced above, and characteristics thereof were evaluated. Although the carbonaceous material of the present invention is suitable for use as an anode of a non-aqueous solvent secondary battery, evaluation was conducted using lithium as a counter electrode in order to accurately evaluate the effects of the present invention, i.e., charging capacity, discharged capacity and irreversible capacity of an active material of the batteries, without being affected by variations in the performance of the counter electrode. Specifically, lithium secondary batteries were produced using lithium metal having stable properties as an anode and the anode materials produced in the Examples and Comparative Examples as a cathode.

Production of Cathode (Carbon Electrode)

To 95 parts by weight of each anode material (carbonaceous material) produced through the steps of removing tar, grinding and heat treatment using the infusibilized pitches obtained in the Examples and Comparative Examples and 5 parts by weight of polyvinylidene fluoride, N-methyl-2-pyrrolidone was added to obtain a paste. The paste was evenly applied onto a copper foil and then dried in a nitrogen gas atmosphere at 130° C. for 30 minutes. An electrode in the shape of a sheet was punched into the shape of a disk having a diameter of 15 mm, and the disk was pressed to obtain an electrode. The weight of the carbonaceous material (anode material) in the electrode was adjusted to about 20 mg, and the disk was pressed such that the filling rate of the carbonaceous material was about 67%.

Production of Anode (Lithium Electrode)

The production was carried out in a glove box in an Ar gas atmosphere. A stainless steel mesh disk having a diameter of 17 mm was spot welded in advance to an external cover of a 2016-sized coin battery can. Then, a thin metal lithium plate with a thickness of 0.5 mm punched into the shape of a disk having a diameter of 15 mm was pressure bonded to the stainless steel mesh disk.

With the cathode and the anode thus produced, a 2016-sized coin nonaqueous electrolytic lithium secondary battery was assembled in an Ar glove box, using an electrolytic solution prepared by adding $LiPF_6$ at the ratio of 1 mol/L to a mixed solvent in which ethylene carbonate, dimethyl carbonate and ethylmethyl carbonate were mixed at the volume ratio of 3:4:4, a microporous polypropylene membrane as a separator, and a polyethylene gasket.

Measurement of Charging Capacity, Discharged Capacity, Irreversible Capacity and Initial Charge-Discharge Efficiency In the lithium secondary battery having a structure as described above, the cathode (carbonaceous material) was doped and dedoped with lithium, and the capacity at that time was measured. The doping was carried out by a constant current/constant voltage method. Charging with constant electric current was carried out at the electric current density of 0.5 mA/cm² until the voltage dropped to 0 V. When the voltage dropped to 0 V, the electric current was attenuated while the constant voltage was maintained. When the electric current dropped to 20 μA, the charging was finished. The value calculated by dividing the quantity of electricity at that time by the weight of carbonaceous material used was defined as charging capacity expressing in terms of Ah/kg.

Similarly, electric current was passed in the reverse direction to thereby dedope lithium with which the carbonaceous material had been doped. The dedoping was carried out at the electric current density of 0.5 mA/cm², and the terminal voltage of 1.5 V was used as the cutoff voltage. The quantity of electricity at that time was defined as discharged capacity expressing in terms of Ah/kg.

The irreversible capacity is a difference between the charging capacity and the discharged capacity.

The initial charge-discharge efficiency is a value which indicates how effectively the active material was used. The initial charge-discharge efficiency was calculated by dividing the discharged capacity by the charging capacity and then multiplying the quotient by 100.

Each measurement of characteristics was carried out at 25° C.

<Measurement of Particle Size>

To about 0.1 g of a sample, three drops of a dispersant (cationic surfactant "SN dispersant 7347-C" (San Nopco Limited)) was added and well blended with the sample. Then, 30 ml of pure water was added and dispersed by an ultrasonic washer for about 2 minutes, and thereafter the particle size distribution within the particle size range of 0.5 to 3000 μm was determined using a particle size distribution analyzer (Shimadzu Corporation, "SALD-3000J"). From the particle size distribution, the particle size at which the cumulative volume was 50% was determined as the average particle size Dv50 (μm).

<Measurement of True Density of Anode Material Precursor>

In accordance with the method specified in JIS R7211, the true density ($\rho_B$) was measured at 30° C. using butanol as a substitution medium.

<Cross-Sectional Analysis by XMA>

Using a JEOL scanning electron microscope (JSM6301F) and an energy dispersive X-ray microanalyzer (JED2140) attached to the microscope, both surface layer portions of a cross-section were analyzed; a point in a 2000-fold field of view was analyzed at an acceleration voltage of 10 kV for an analysis time of 400 seconds, and the measurement per sample was n=2.

Method of Preparing Samples

While optical microscopic observation was conducted to confirm that there was no defect in the surface layer portions, the sample was picked up with a pair of tweezers and broken. The broken sample was fixed with a carbon tape to an SEM sample table with the broken surface facing upward, and the sample surface was subjected to conductivity treatment (platinum, coating time 1.5 minutes). Thereafter, the sample was placed in an SEM and the field of view to be analyzed was determined. The angle of the sample was adjusted such that the sample surface was perpendicular to a surface to be observed. After this adjustment, an arbitral point in the field of view was analyzed. As a reference, one point in a central portion (portion which was considered to contain no oxygen) of the broken surface was also analyzed. As to the results of the analysis of the respective points, the number of carbon counted and the number of oxygen counted were read from the chart for each point, and the ratio thereof (O/C ratio) was calculated. This value was used as an oxygen concentration at the point analyzed.

<Preparation of Material to be Subjected to Infusibilization Treatment>

(1) Porous Pitch Beads

Reference Examples 1 and 2

In a pressure-resistant vessel equipped with a stirrer blade and an outlet nozzle and having an internal volume of 300 L, 70 kg of petroleum based pitch having a softening point of 205° C. and a H/C atomic ratio of 0.65 and 30 kg of naphthalene were charged, melt blended by heating at 190° C. and thereafter cooled to 80 to 90° C. Then, the inside of the pressure-resistant vessel was pressurized with nitrogen gas so that the material contained was extruded through the outlet nozzle to obtain a string-shaped molded pitch having a diameter of about 500 μm. Then, the string-shaped molded pitch was ground such that the resulting ground pitch had a length (L)-diameter(D) ratio (L/D) of about 1.5. The ground pitch was added to an aqueous solution which was heated to 93° C. and in which 0.53 wt % of polyvinyl alcohol (degree of saponification: 88%) was dissolved, and the mixture was dispersed by stirring and cooled, whereby a spherical molded pitch slurry was obtained. After a major portion of water was removed by filtration, naphthalene in the spherical molded pitch was removed by extraction with n-hexane in an amount by weight which was about 6-fold the weight of the molded pitch. Thereafter, the sample was dried and n-hexane was removed, whereby a porous spherical molded pitch (porous pitch beads) was obtained.

(2) Finely Ground Pitch

Reference Examples 3 and 4

A petroleum based pitch having a softening point of 205° C. and a H/C atomic ratio of 0.65 was cooled to the softening point or below so that it was solidified. This sample was broken to a diameter of about 5 cm with a hammer and then coarsely ground with a blade mill (Hosokawa Micron Corporation, FM1-F) until the average particle size was about 1 mm or smaller. Thereafter, the ground sample was finely ground with an impact type mill (Hosokawa Micron Corporation, ACM-10A pulverizer). The resulting finely ground sample had an average particle size of 10 μm and a maximum particle size of 52 μm.

(3) Coarsely Ground Pitch

Comparative Examples 1 and 2

A petroleum based pitch having a softening point of 205° C. and a H/C atomic ratio of 0.65 was cooled to the softening point or below so that it was solidified. This sample was ground in a mortar. The coarse petroleum pitch powder thus ground was sieved, and the powder which had an average particle size of 4 mm was used as a coarsely ground pitch.

(4) Porous Compression Molded Circular Tablet

Examples 1 to 3, Comparative Examples 3 and 4

Using a press molding machine (Kodaira Seisakusho Co., Ltd., PY-70), a pressure specified in Table 1 was applied to the finely ground pitch produced by the above method (2) (average particle size: 10 μm) to thereby compression mold the finely ground pitch into the shape of a circular tablet having a diameter of 20 mm.

(5) Porous Compression Molded Stick Type Tablet

Examples 4 to 12

Using a stick roll pelletizer (Hosokawa Micron Corporation, CS-25; stick roll groove width: length 28×width 6×3 mm; roll clearance: 0.6 mm), the finely ground pitch produced by the above method (2) (average particle size: 10 μm) was compression molded into the shape of a stick type tablet under the conditions of number of roll rotations and roll pressure specified in Table 1.

(6) Coarsely Ground, Porous Compression Molded Stick Type Tablet

Examples 13 and 14

A porous compression molded stick type tablet of Example 6 of (5) was ground in a mortar. This ground sample was sieved, and the ground sample which had an average particle size of 500 μm or greater and smaller than 840 μm and the ground sample which had an average particle size of 840 μm to 2000 μm were used.

(7) Coarsely Ground, Porous Compression Molded Plate

Examples 15, 16 and 17

Using a roll pelletizer (Turbo Kogyo Kabushikikaisha, WP160×60N1; roll groove: transverse grooves+diagonal grooves; roll size: diameter 160 mm×width 60 mm; roll clearance: 0.5 mm; grinder: combined Br), the finely ground pitch produced by the above method (2) (average particle size: 10 μm and 14 μm) was compression molded in the shape of a plate under the conditions of roll rotations and roll pressure specified in Table 1 and thereafter crushed.

<Infusibilization (Oxidation)>

Infusibilization conditions A: A sample to be charged for infusibilization in an amount by weight specified in Table 1 was placed on a high density flat alumina plate and charged in an electric muffle furnace (DENKEN CO., LTD, KDF S-100), and the sample was heated from 110° C. to 260° C. at the heating rate of 5° C./h while flowing air at the flow rate of 20 L/min and then maintained at 260° C. for 5 hours, whereby the sample was infusibilized.

Infusibilization conditions B: A sample to be charged for infusibilization in an amount by weight specified in Table 1 was placed on a high density flat alumina plate and charged in an electric muffle furnace (DENKEN CO., LTD, KDF S-100), and the sample was heated from 110° C. to 220° C. at the heating rate of 30° C./h while flowing air at the flow rate of 20 L/min and then maintained at 220° C. for 5 hours, whereby the sample was infusibilized.

When infusibilization is conducted under the infusibilization conditions A, in general an infusibilized pitch having an oxygen content of 20 to 22 wt % is obtained. When infusibilization is conducted under the infusibilization conditions B, in general an infusibilized pitch having an oxygen content of 7 to 12 wt % is obtained. Accordingly, if the oxygen content is below the above range, it indicates that the infusibilization was not developed sufficiently.

The results of measurement of the oxygen content of the infusibilized samples are shown in Table 1.

TABLE 1

| Examples | Whether compression molding was conducted | Average particle size before compression molding (μm) | Particle size at the time of infusibilization treatment | Molding conditions Molding pressure (MPa) | Time for which pressure was maintained (sec.) | Molding conditions Molding pressure (MN/m) | Number of roll rotations (min$^{-1}$) | Amount passed between rolls (kg/h) | Amount by weight of sample charged for infusibilization (g) | Infusibilization treatment temperature (° C.) | Oxygen content (wt %) |
|---|---|---|---|---|---|---|---|---|---|---|---|
| Example 1 | conducted | 10 | 20-mm (diameter) tablet | 24.2 | 3 | — | — | — | 2.71 | 220° C. | 10.8 |
| Example 2 | conducted | 10 | 20-mm (diameter) tablet | 48.4 | 3 | — | — | — | 2.91 | 220° C. | 9.5 |
| Example 3 | conducted | 10 | 20-mm (diameter) tablet | 84.8 | 3 | — | — | — | 2.47 | 220° C. | 10.5 |
| Example 4 | conducted | 10 | 6-mm (diameter) × 20-mm stick | — | — | 5.9 | 5 | 54.5 | 0.58 | 220° C. | 7.8 |
| Example 5 | conducted | 10 | 6-mm (diameter) × 20-mm stick | — | — | 2.9 | 7.5 | 54.2 | 0.56 | 220° C. | 9.9 |
| Example 6 | conducted | 10 | 6-mm (diameter) × 20-mm stick | — | — | 2.9 | 5 | 54.9 | 1.02 | 220° C. | 10.3 |
| Example 7 | conducted | 10 | 6-mm (diameter) × 20-mm stick | — | — | 5.9 | 5 | 54.5 | 1.56 | 260° C. | 20.5 |
| Example 8 | conducted | 10 | 6-mm (diameter) × 20-mm stick | — | — | 5.9 | 7.5 | 49.0 | 1.61 | 260° C. | 22.0 |
| Example 9 | conducted | 10 | 6-mm (diameter) × 20-mm stick | — | — | 2.9 | 7.5 | 54.2 | 1.1 | 260° C. | 21.6 |
| Example 10 | conducted | 10 | 6-mm (diameter) × 20-mm stick | — | — | 2.9 | 5 | 54.9 | 2.87 | 260° C. | 22.0 |
| Example 11 | conducted | 10 | 6-mm (diameter) × 20-mm stick | — | — | 1.0 | 5 | 61.4 | 2.69 | 260° C. | 21.9 |
| Example 12 | conducted | 10 | 6-mm (diameter) × 20-mm stick | — | — | 1.0 | 7.5 | 53.6 | 1.57 | 260° C. | 22.0 |
| Example 13 | conducted | 10 | 500 to 840 μm | — | — | 5.9 | 5 | 54.5 | 2.49 | 220° C. | 8.0 |
| Example 14 | conducted | 10 | 840 to 2000 μm | — | — | 5.9 | 5 | 54.5 | 1.06 | 220° C. | 7.9 |
| Example 15 | conducted | 10 | 500 to 1000 μm | — | — | 0.2 | 15 | 74.2 | 25.3 | 220° C. | 10.2 |

TABLE 1-continued

| Examples | Whether compression molding was conducted | Average particle size before compression molding (μm) | Particle size at the time of infusibilization treatment | Molding conditions Molding pressure (MPa) | Time for which pressure was maintained (sec.) | Molding conditions Molding pressure (MN/m) | Number of roll rotations (min$^{-1}$) | Amount passed between rolls (kg/h) | Amount by weight of sample charged for infusibilization (g) | Infusibilization treatment temperature (° C.) | Oxygen content (wt %) |
|---|---|---|---|---|---|---|---|---|---|---|---|
| Example 16 | conducted | 10 | 500 to 1000 μm | — | — | 0.6 | 15 | 73.3 | 25.1 | 220° C. | 8.7 |
| Example 17 | conducted | 14 | 500 to 1000 μm | — | — | 0.4 | 15 | 74.3 | 25.0 | 220° C. | 9.6 |
| Reference Example 1 | not conducted | — | 580 to 840 μm | — | — | — | — | — | 1.43 | 220° C. | 8.2 |
| Reference Example 2 | not conducted | — | 580 to 840 μm | — | — | — | — | — | 2.43 | 260° C. | 20.9 |
| Reference Example 3 | not conducted | — | 10 μm | — | — | — | — | — | 18.48 | 220° C. | 10.6 |
| Reference Example 4 | not conducted | — | 10 μm | — | — | — | — | — | 3.6 | 260° C. | 21.3 |
| Comparative Example 1 | not conducted | — | 4 mm | — | — | — | — | — | 0.81 | 220° C. | 5.4 |
| Camparative Example 2 | not conducted | — | 4 mm | — | — | — | — | — | 3.74 | 260° C. | 11.5 |
| Comparative Example 3 | conducted | 10 | 20-mm (diameter) tablet | 169.6 | 3 | — | — | — | 2.17 | 220° C. | 4.2 |
| Comparative Example 4 | conducted | 10 | 20-mm (diameter) tablet | 363.3 | 3 | — | — | — | 2.47 | 220° C. | 1.7 |

From Table 1 it is understood that by subjecting a porous compression molded pitch prepared by the method of the present invention to infusibilization treatment, a suitable oxygen content for an anode material for a non-aqueous electrolyte secondary battery is achieved. It should be noted, however, that as shown in Comparative Examples 3 and 4, an excessively high molding pressure will result in insufficient infusibilization.

FIG. 3 shows for comparison an XMA cross sectional image of the infusibilized pitch obtained by subjecting the porous pitch beads of the conventional method to infusibilization treatment (Reference Example 2) and an XMA cross sectional image of the infusibilized pitch obtained by subjecting the porous compression molded pitch of the method of the present invention to infusibilization treatment (Example 15). From the images shown in FIG. 3 and the O/C ratio, no difference in oxygen concentration was confirmed between the surface layer and the center; it is understood that the concentration of oxygen in the carbon is uniform.

FIG. 4 shows for comparison an XMA cross sectional image of the infusibilized pitch obtained by infusibilizing the coarsely ground pitch of the conventional method under the infusibilized conditions A (Comparative Example 2). The XMA cross sectional image and the O/C ratios shown in FIG. 4 indicate that there is a layered region with different oxygen concentrations in the surface layer and in the center.

FIG. 5(a) shows the battery performance of the anode material for a non-aqueous electrolyte secondary battery which was produced through the steps of removing tar, grinding and heat treatment using the porous pitch beads of the conventional method (Reference Example 2). FIG. 5(b) shows the battery performance of the anode material for a non-aqueous electrolyte secondary battery which was produced through the steps of removing tar, grinding and heat treatment using the porous compression molded pitch of the present invention (Example 11). Curves shown in FIGS. 5(a) and 5(b) substantially coincide and there is almost no difference; it is clear that the anode material for a non-aqueous electrolyte secondary battery which was produced through the steps of removing tar, grinding and heat treatment using the porous compression molded pitch of the present invention achieves the same level of battery performance as that of the material produced by the conventional method.

The invention claimed is:

1. A method of producing an anode material for a non-aqueous electrolyte secondary battery, comprising:
    cooling a petroleum based or coal based pitch to a softening point or below so that the petroleum based or coal based pitch is solidified to obtain a solidified pitch without steps of blending by addition of an additive and extracting the additive with a solvent,
    grinding the solidified pitch to form a fine pitch powder having a median size of 5 μm to 40 μm,
    compression molding the fine pitch powder to form a porous compression molded pitch, and
    subjecting the porous compression molded pitch to infusibilization treatment to obtain an infusibilized pitch having an oxygen content of 5 to 25 wt %.

2. The method of claim 1, wherein the compression molding is conducted at a pressure of 20 to 100 MPa or 0.1 to 6 MN/m.

3. The method of claim 1, further comprising classifying the fine pitch powder having a median size of less than 5 μm, melting at a softening point of the fine pitch powder or higher, and then cooling again to the softening point or below so that the fine pitch powder is solidified and reused as a solidified pitch.

4. The method of claim 3, wherein the softening point is in the range of 140° C. to 260° C.

* * * * *